United States Patent
Beck et al.

(10) Patent No.: US 11,653,217 B2
(45) Date of Patent: May 16, 2023

(54) CHANNEL SELECTION IN A SHARED SPECTRUM COMMUNICATION NETWORK

(71) Applicant: CommScope Technologies LLC, Hickory, NC (US)

(72) Inventors: Andrew E. Beck, Ashburn, VA (US); Ariful Hannan, Sterling, VA (US)

(73) Assignee: CommScope Technologies LLC, Hickory, NC (US)

( * ) Notice: Subject to any disclaimer, the term of this patent is extended or adjusted under 35 U.S.C. 154(b) by 103 days.

(21) Appl. No.: 17/208,449

(22) Filed: Mar. 22, 2021

(65) Prior Publication Data

US 2021/0297868 A1 Sep. 23, 2021

Related U.S. Application Data

(63) Continuation of application No. 16/567,769, filed on Sep. 11, 2019, now Pat. No. 10,959,106.

(60) Provisional application No. 62/731,408, filed on Sep. 14, 2018.

(51) Int. Cl.
*H04W 72/00* (2009.01)
*H04W 16/14* (2009.01)
*H04W 72/06* (2009.01)
*H04W 48/16* (2009.01)
*H04W 24/08* (2009.01)
*H04W 72/10* (2009.01)

(52) U.S. Cl.
CPC .......... *H04W 16/14* (2013.01); *H04W 24/08* (2013.01); *H04W 48/16* (2013.01); *H04W 72/06* (2013.01); *H04W 72/10* (2013.01)

(58) Field of Classification Search
CPC ..... H04W 16/14; H04W 24/08; H04W 48/16; H04W 72/06; H04W 72/10

USPC ........................................................ 455/454
See application file for complete search history.

(56) References Cited

U.S. PATENT DOCUMENTS

| 9,351,282 B2 | 5/2016 | Freda et al. |
| 9,813,914 B2 | 11/2017 | Stanforth et al. |
| 2010/0173586 A1 | 7/2010 | McHenry et al. |

(Continued)

FOREIGN PATENT DOCUMENTS

| EP | 3166366 A1 | 5/2017 |
| WO | 2018150303 A1 | 8/2018 |

OTHER PUBLICATIONS

AT&T, "Use Cases and Scenarios for NR-U", 3GPP TSG-RAN WG1 NR Ad hoc 1801, Jan. 2018, pp. 1-2, 3GPP.

(Continued)

*Primary Examiner* — Temica M Beamer
(74) *Attorney, Agent, or Firm* — Fogg & Powers LLC (57) ABSTRACT

A method for selecting at least one channel for a network element in a shared spectrum communication system is provided. The method includes identifying a plurality of candidate channels of a frequency band of the shared spectrum communication system. For each channel of the plurality of channels, the method further includes: evaluating the channel based on one or more of a plurality of criteria for the network element; scoring the channel based on the evaluation of the channel for the network element; and ranking the plurality of candidate channels based on the assigned scores for each of the plurality of channels. The method further includes selecting at least one channel based on the ranking of the plurality of candidate channels.

19 Claims, 7 Drawing Sheets

(56) References Cited

U.S. PATENT DOCUMENTS

| | | | |
|---|---|---|---|
| 2012/0165059 | A1 | 6/2012 | Schmidt et al. |
| 2014/0036791 | A1 | 2/2014 | Kornacki |
| 2015/0163671 | A1 | 6/2015 | Stanforth et al. |
| 2016/0088631 | A1 | 3/2016 | Hedayat et al. |
| 2016/0234850 | A1 | 8/2016 | Freda et al. |
| 2017/0238316 | A1 | 8/2017 | Li et al. |
| 2017/0374557 | A1 | 12/2017 | Mueck et al. |
| 2018/0132288 | A1 | 5/2018 | Aguirre et al. |
| 2019/0075549 | A1 | 3/2019 | Yucek et al. |
| 2020/0092731 | A1 | 3/2020 | Beck et al. |
| 2020/0343984 | A1* | 10/2020 | Zhao .................... H04B 17/373 |
| 2020/0359223 | A1* | 11/2020 | Kim ...................... H04W 24/10 |
| 2021/0289513 | A1* | 9/2021 | Hafeez ................. H04W 24/02 |

OTHER PUBLICATIONS

Ericsson, "Candidate spectrum for NR unlicensed operation", 3GPP TSG RAN WG1 Meeting #92, Feb. 2018, pp. 1-5, Ericsson.

ETRI, "Spectrum Policy and Standardization Trends on Frequency Sharing", 2018, pp. 1-10, https://ettrends.etri.re.kr.

International Searching Authority, "International Search Report and Written Opinion from PCT Application No. PCT/US2019/050643", from Foreign Counterpart to U.S. Appl. No. 16/567,769, dated Dec. 26, 2019, pp. 1-12, Published: WO.

U.S. Patent and Trademark Office, "Final Office Action", U.S. Appl. No. 16/567,769, dated Mar. 20, 2020, pp. 1 through 16, Published: US.

U.S. Patent and Trademark Office, "Notice of Allowance", U.S. Appl. No. 16/567,769, dated Nov. 16, 2020, pp. 1 through 5, Published: US.

U.S. Patent and Trademark Office, "Office Action", U.S. Appl. No. 16/567,769, dated Aug. 6, 2020, pp. 1 through 8, Published: US.

U.S. Patent and Trademark Office, "Office Action", U.S. Appl. No. 16/567,769, dated Oct. 21, 2019, pp. 1-8, Published: US.

European Patent Office, "Extended European Search Report from EP Application No. 19859997.9", from Foreign Counterpart to U.S. Appl. No. 16/567,769, dated May 11, 2022, pp. 1 through 9, Published: EP.

* cited by examiner

CHANNEL SELECTION IN A SHARED SPECTRUM COMMUNICATION NETWORK

CROSS-REFERENCE TO RELATED APPLICATIONS

This U.S. Patent Applications claims priority to, and the benefit of, U.S. patent application Ser. No. 16/567,769, titled "CHANNEL SELECTION IN A SHARED SPECTRUM COMMUNICATION NETWORK" and filed on Sep. 11, 2019, which claims priority to, and the benefit of, U.S. Provisional Patent Application No. 62/731,408, titled "CHANNEL SELECTION IN A SHARED SPECTRUM COMMUNICATION NETWORK" and filed on Sep. 14, 2018, which applications are hereby incorporated by reference in their entirety.

BACKGROUND

The Citizens Broadband Radio System (CBRS) is a model for shared spectrum use in the 3.5 GHz band as created by the Federal Communications Commission of the United States government. The CBRS model includes three levels of access. Tier I of the CBRS model is dedicated to incumbents who currently use portions of the band. Tier II of the CBRS model is allocated for Priority Access Licenses (so-called PALs) which allow new or existing users to purchase a block of spectrum for exclusive use in a geographic area provided there is no interference with Tier I users. Finally, Tier III of the CBRS model is allocated for General Authorized Access (GAA) available to any use provided there is no interference to Tier I or Tier II users. Access across all tiers is managed by a Spectrum Access System (SAS).

The CBRS band includes 150 MHz of total bandwidth and depending on availability, users may consume from 5 MHz up to the entire 150 MHz for a given geographic area. For convenience, the CBRS band can be thought of as channels. The 150 MHz can be represented as thirty 5 MHz channels, fifteen 10 MHz channels, seven 20 MHz channels or any appropriate combination of 5, 10 and 20 MHz channels. For pedagogical purposes, this disclosure refers to a generic "channel", independent of bandwidth unless otherwise noted.

Not all channels in the CBRS band are created equal. Some CBRS channels may be more sensitive, creating interference to, or receiving interference from, users in adjacent bands. Some CBRS channels may be susceptible to a brief use suspension by the SAS due to temporal incumbent activity. Still others CRBS channels may have a higher probability of limited access due to incumbent interference caused by an aggregation of user signals. Some CBRS channels, for sites located in an Exclusion Zone, are prohibited for use all together.

For a wireless operator wishing to utilize the CBRS band, it is desired to choose channels that would provide the best desired signal coverage, and be less susceptible to suspension or power reductions by the SAS, both at site commissioning and for future use. Common methods for a system operator to choose a channel would be for a Citizens Broadband Radio System Device (CBSD) to query the SAS for available channels and optionally the maximum Effective Isotropic Radiated Power (EIRP) the SAS would allocate to the channel. The CBSD could choose the available channel that meets its EIRP needs. A second method would be for a CBSD to actively scan the radio frequencies associated with channels and measure the received channel power as an indication of channel utilization. The CBSD could choose the channel with the lowest received channel power assuming this measurement indicates a lack of use by others. Both methods may give a good indication of currently available channels but may turn out to be a poor channel selection due to factors other than current availability.

This invention describes a more robust method for choosing a CBRS channel attempting to maximize near and long term objectives.

SUMMARY

In one embodiment, the present invention provides a method for selecting at least one channel for a network element in a shared spectrum communication system. The method includes identifying a plurality of candidate channels of a frequency band of the shared spectrum communication system. For each channel of the plurality of channels, the method further includes: evaluating the channel based on one or more of a plurality of criteria for the network element; scoring the channel based on the evaluation of the channel for the network element; and ranking the plurality of candidate channels based on the assigned scores for each of the plurality of channels. The method further includes selecting at least one channel based on the ranking of the plurality of candidate channels.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention relate to selection of a channel in a frequency band of a shared spectrum communication system, such as the Citizens Broadband Radio System (CBRS) authorized by the Federal Communications Commission. Embodiments of the present invention represent an improvement to such shared spectrum communication systems through consideration of various criteria used to rank the channels that can be requested by a network element such as a Citizens Broadband Radio System Device (CBSD). The ranking of channels is accomplished by a "channel evaluator" that may reside within a CBSD (FIG. 1), the spectrum access system (SAS) (FIG. 4) or as a stand-alone entity that communicates with either a CBSD or the SAS of the CBRS. In each embodiment, the channel evaluator identifies a number of candidate channels that could be used by a network element. The Channel evaluator then uses one or more of a plurality of criteria to evaluate each of the candidate channels to determine the relative merits of each of the candidate channels as discussed in more detail below.

Figure 1:
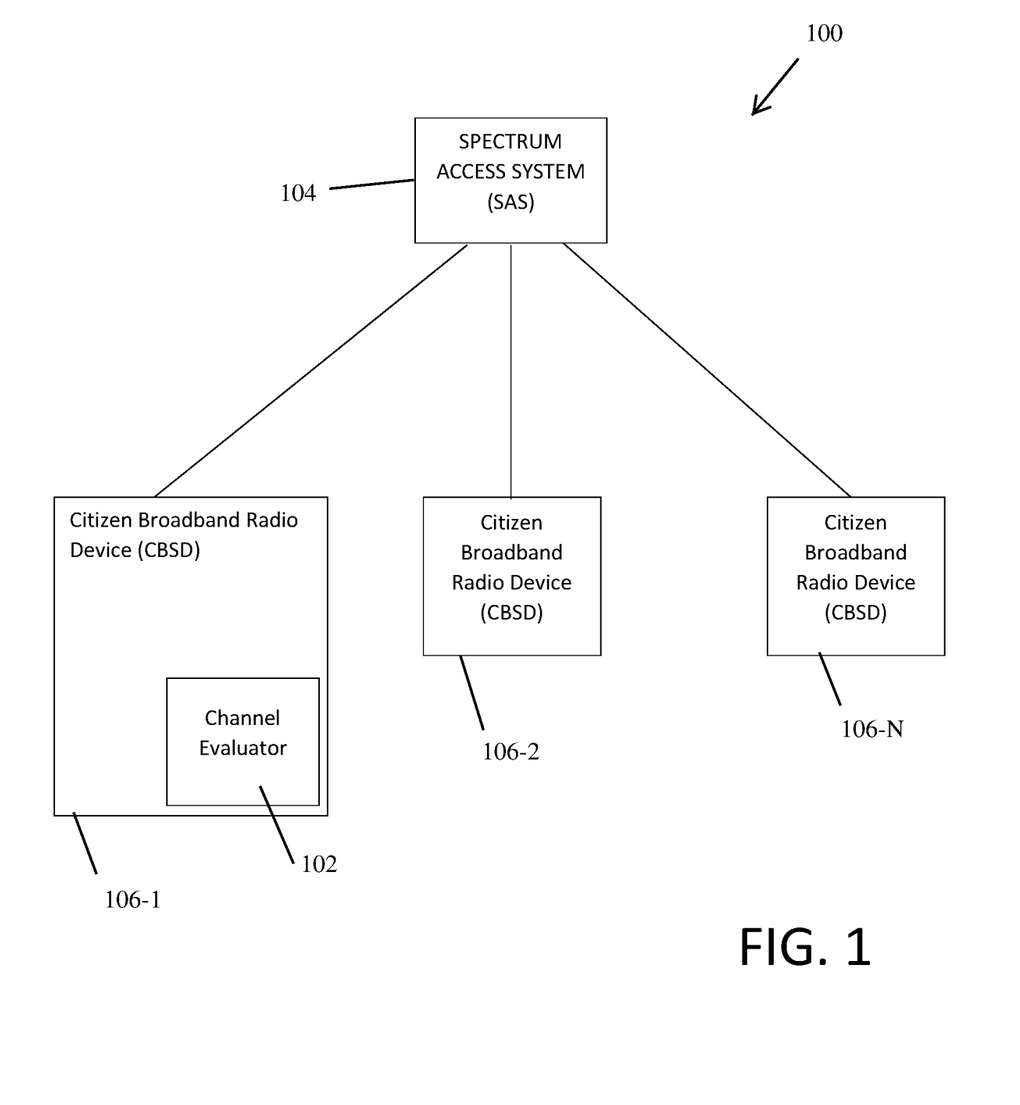
FIG. 1 is a block diagram of one embodiment of a shared spectrum communication system that includes a channel evaluator according to the teachings of the present invention.

FIG. 1 is a block diagram of one embodiment of a shared spectrum communication system, indicated general at 100, which includes a channel evaluator 102 according to the teachings of the present invention. In one embodiment, system 100 is a CBRS network. System 100 includes a spectrum access system (SAS) 104 and a number of network elements or CBSDs 106-1 to 106-N. In this embodiment, channel evaluator 102 resides in each CBSD and is used by the CBSD to evaluate and rank candidate channels when the CBSD requests access to a channel from SAS 104.

SAS 104 grants access to a communication channel in system 100 for a CBSD using a known protocol established by, for example the WInnForum standard, which involves a request for access to a channel from the CBSD. However, the WInnForum standard does not specify how the CBSD determines which channel to request. Thus, incorporation of channel evaluator 102 into the operation of system 100 is an improvement to the way that access is granted to channels in shared spectrum communication systems.

Figure 2:
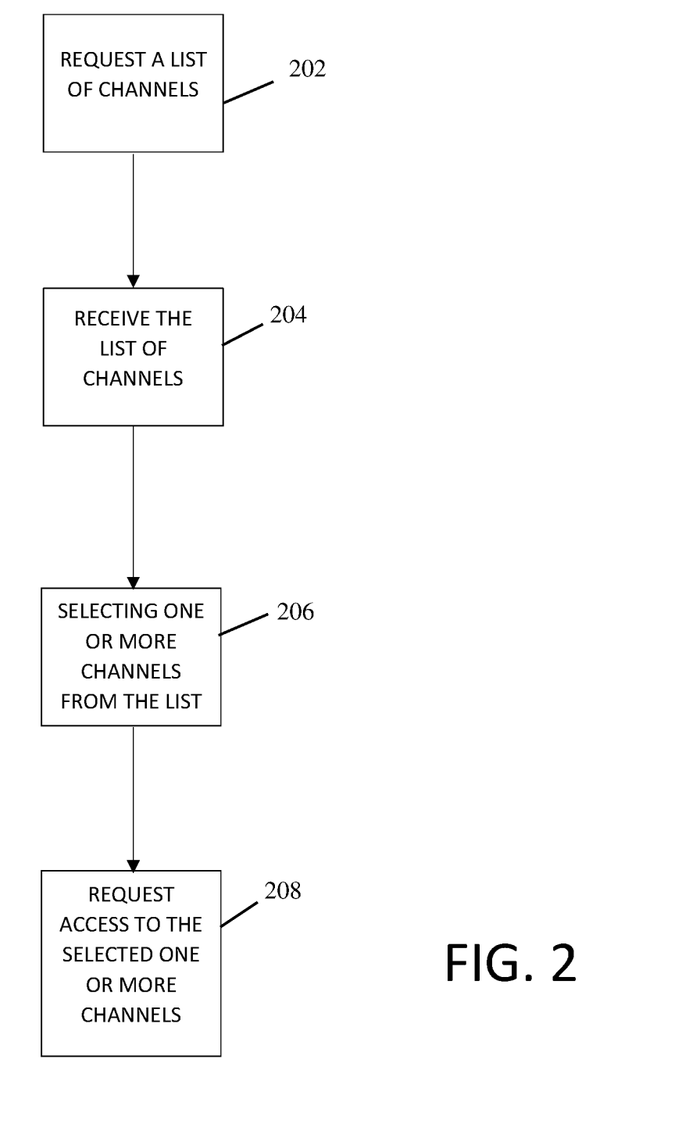
FIG. 2 is a flow chart of one embodiment of a process for selecting a channel for a network element in a shared spectrum communication system according to the teachings of the present invention.

One embodiment of a process for selecting a channel for a network element (CBSD) in the shared spectrum communication system of FIG. 1 is illustrated in the flow chart of FIG. 2. When a CBSD, e.g., CBSD 106-1, is ready to request access to a channel, CBSD 106-1 requests a list of channels from channel evaluator 102 at block 202. Channel evaluator 102 applies a number of criteria to evaluate a number of candidate channels as explained in more detail below. At block 204, channel evaluator 102 returns a list of channels to CBSD 106-1. The list of channels provided by channel evaluator 102 includes a ranking of the respective candidate channels according the criteria used to evaluate the channels. At block 206, the CBSD 106-1 selects one or more channels (such as a primary channel and one or more secondary or backup channels) from the list of channels received from the channel evaluator. At block 208, the CBSD 106-1 sends a request to SAS 104 to request access to the selected channels from the ranked list of channels. Thus, by evaluating the candidate channels according to a set of criteria for the CBSD, the channel assigned by the SAS is more likely to provide a better level of service than if a channel were selected without input from the channel evaluator. This is thus an improvement in shared spectrum communications systems.

Figure 3:
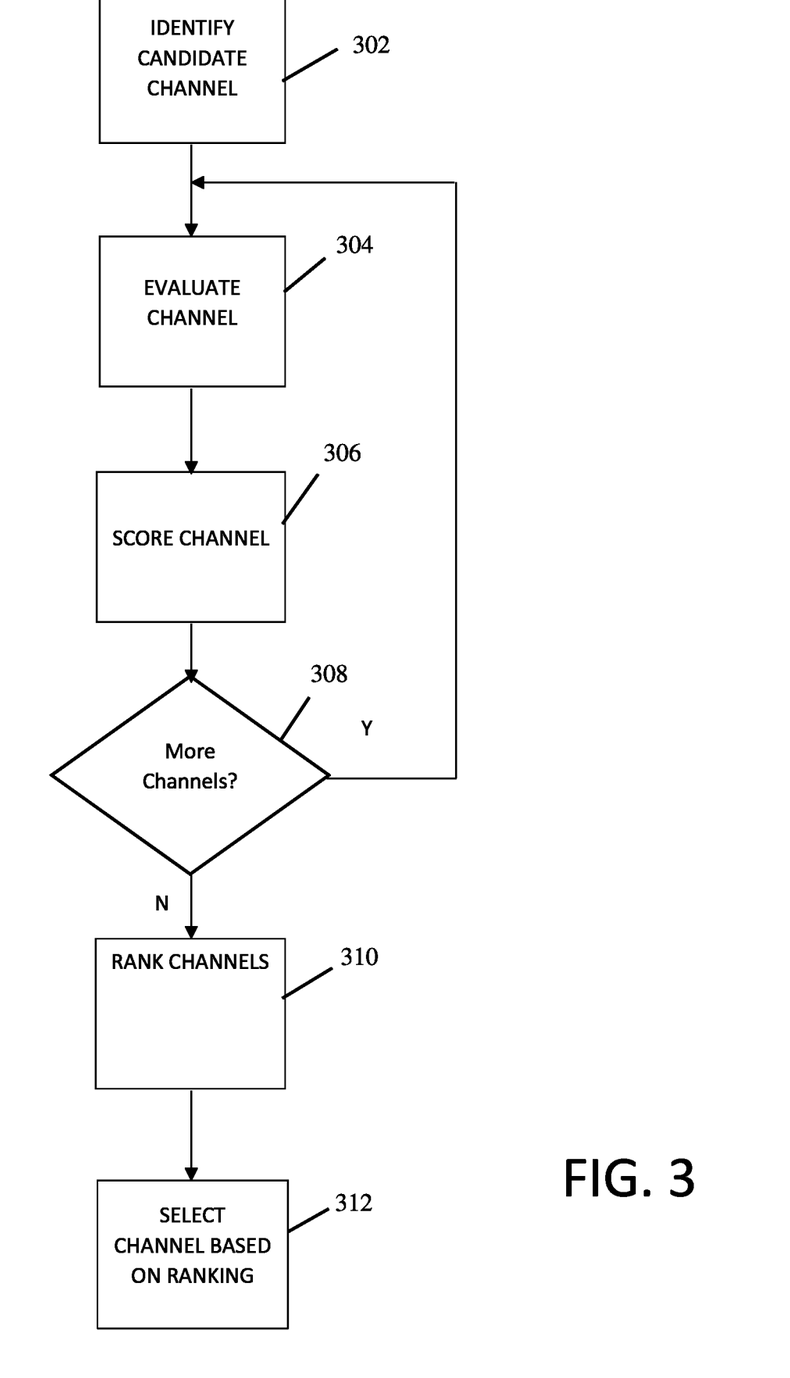
FIG. 3 is flow chart of another embodiment of a process for selecting a channel for a network element in a shared spectrum communication system according to the teachings of the present invention.

FIG. 3 is flow chart of another embodiment of a process for selecting a channel for a network element in a shared spectrum communication system, such as system 100 of FIG. 1, according to the teachings of the present invention. The process begins as block 302 by identifying one or more candidate channels. For example, in a CBRS, the process identifies one or more of the channels in the 150 MHz channel in the 3.5 GHz band. For example, the process can identify any of the channels in the band, such as any number of 5 MHz, 10 MHz, or 20 MHz channels. At blocks 304 and 306, the process evaluates and scores each of the selected channels until, at block 308, the process determines that there are no more channels to evaluate and score.

The process evaluates the candidate channels based on a specified set of criteria. These criteria are provided, for example, by the network element or CBSD that is requesting the evaluation of the channels. The following is a non-exhaustive list of criteria that may be used to evaluate and score the candidate channels. Not all of the criteria are used in each instance. Further, other criteria can be used that assist the CBSD in selecting a channel that improves the use of the shared spectrum of the communication system. In one embodiment, the evaluation criteria include:

DPA—Dynamic Protection Areas are frequency specific geographic regions for which a limited frequency band must suspend service if a federal incumbent wishes to temporarily use one or more channels in a geographic area. In one embodiment, channels which are evaluated to be geographically distant or outside of the frequency range impacting the DPA are assigned a high channel score under this criteria. Similarly, channels for sites which are evaluated to be located close to the DPA and impacting the frequency range of the DPA are assigned a low score under this criteria.

PAL—Priority Access Licenses are Tier II users of a CBRS that pay a fee for licensed access to a frequency band. PAL channels actively in use are not available to other PAL or GAA users and are not considered at block 302 as available channels for evaluation or ranking (excluded from step 1). PAL channels that have been granted a license but not yet in use are identified as candidate channels at block 302. PALs may be purchased for a set geographic region (such as census tracts or counties). Actual use of the PAL frequencies may be over a smaller region which may grow over time. In one embodiment, channels which are evaluated to fall under a PAL license within a license area but not (yet) used activated or claimed as a PAL Protection Area (PPA) are assigned a low score under this criteria. This is due to the higher probability of the channel becoming unavailable in the future due to PAL expansion. Similarly, channels which are evaluated to not be near a frequency overlapping PAL license area are assigned a high score under this criteria.

Interference margin—Rules for the protection of some incumbents are based on the aggregate interference of all sites using the same channel in geographic proximity to the incumbent. An example of this are Fixed Satellite Station incumbents. Channel usage may be unrestricted until the population of neighbor CBRS sites builds to the point when incumbent aggregate interference thresholds are exceeded. The difference between the total aggregate site interference signal level and the allowable threshold is referred to as the interference margin. Sites with a lower interference margin have a higher probability of having their transmit power reduced in the future due to future incumbent impact. Thus, in one embodiment, channels for sites that are evaluated to have a low interference margin are assigned a low score and sites that are evaluated to have a high interference margin are assigned a high score.

In some embodiments, the score for interference margin accounts for the difference between the individual interference for a channel and a fair quota. The fair quota is 1/N for N number of CBSD impacting any protection point. If the difference (Interference for a channel—1/N fair quota) is positive, then the score for that channel will be proportionally low. Conversely, if the difference is negative, the score for the requested channel will be proportionally high.

Historical data—In one embodiment, temporal incumbent use history is used to develop pattern data. For example, offshore DPA use is dictated by US navy radar operations. Naval operations may follow set shipping routes, repeatable use regions and channel frequencies which cause some DPAs to be activated at a higher rate than others. In one embodiment, channels that are evaluated to be located near DPAs which have a higher historical activation rate receive a lower score than channels which see lower historical activation rates.

Coverage Area—In one embodiment, the potential coverage area of the CBSD is evaluated as a criteria in channel ranking. For example, channels that are found to be for sites that are located indoors, have a very small coverage area or located in isolated areas (such as large shipping terminals) receive a higher score than channels for sites that are outdoors, have large coverage areas, or in congested areas. This reflects the lower probability of interference or incumbent overlap in isolated coverage areas.

Adjacent band—In one embodiment, the location of a channel within the band is evaluated as a criteria in ranking candidate channels. For example, channels located on the CBRS band edges (such as lower and upper edges) are more likely to cause interference to adjacent bands or be subjected to interference from users in adjacent bands. Therefore, in one embodiment, channels that are evaluated to be edge channels receive a lower score than those located more central in frequency to the CBRS band.

Contiguous bandwidth—In one embodiment, the bandwidth of a channel is evaluated as a criteria in ranking candidate channels. Higher bandwidth channels may be more susceptible to incumbent use or interference just because of the fact that their bandwidth occupies a larger frequency range. Therefore, candidate channels that are evaluated to have higher channel bandwidths (e.g. 20 MHz) are assigned a lower score than lower channel bandwidths (e.g. 5 MHz).

For each criteria, scoring may utilize a coarse or fine granularity. Different score values may be used for different categories or criteria. For example, a binary "low" or "high" score may be applicable for the adjacent band evaluation. A qualitative score, such as "low," "medium," or "high," may be more applicable to the contiguous bandwidth category or criteria. Furthermore, a numerical score, such as a value from 1 to 10, may be more appropriate for DPA evaluation, with the extra granularity reflecting the distance and/or impact to a DPA region. All scales are such that they can be optionally combined to form a final score for each channel at a given geographical location. In one embodiment, the final score is used for channel ranking. Alternatively, in other embodiments, scores for the individual criteria are weighted based on the CBSD use case and the overall score is a weighted combination of the individual scores. In other embodiments, the overall score is based on the score of one or more of the highest priority categories or criteria. In other embodiments, the final score can also be based on the priority of the CBSD based on different criteria. The CBSD, in one embodiment, provides the priorities to the channel evaluator.

Returning to FIG. 3, the process ranks the channels at block 310 and then the CBSD selects one or more channels (primary and secondary/backup channels) to request from SAS 104 at block 312.

In one embodiment, the channel evaluation could be performed during pre-deployment analysis and programmed into the CBSD before or during deployment. In other embodiments, the analysis is performed near real-time when the CBSD needs to request access to a channel. The CBSD would then use this ranking to request primary and optionally, secondary/backup channels.

Figure 4:
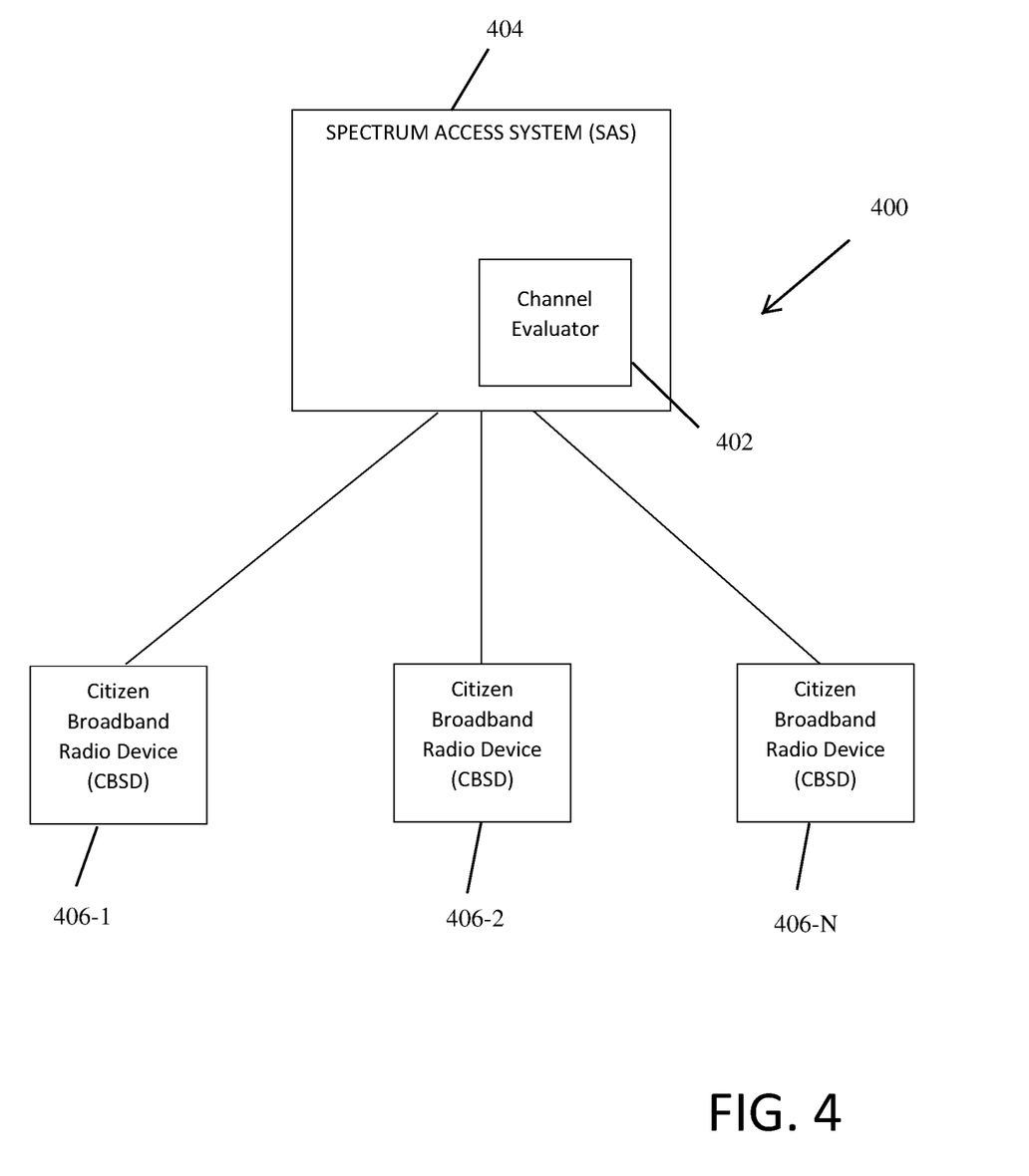
FIG. 4 is a block diagram of another embodiment of a shared spectrum communication system that includes a channel evaluator according to the teachings of the present invention.

FIG. 4 is a block diagram of another embodiment of a shared spectrum communication system, indicated generally at 400, which includes a channel evaluator 402 disposed in SAS 404 according to the teachings of the present invention. In this embodiment, channel evaluator 402 pushes channel rankings to each CBSD based on criteria for the specific CBSD. Each CBSD 406-1 to 406-N then uses the channel rankings to select and request one or more channels (such as primary and secondary/backup channels) from SAS 404 similarly as explained above.

Figure 5:
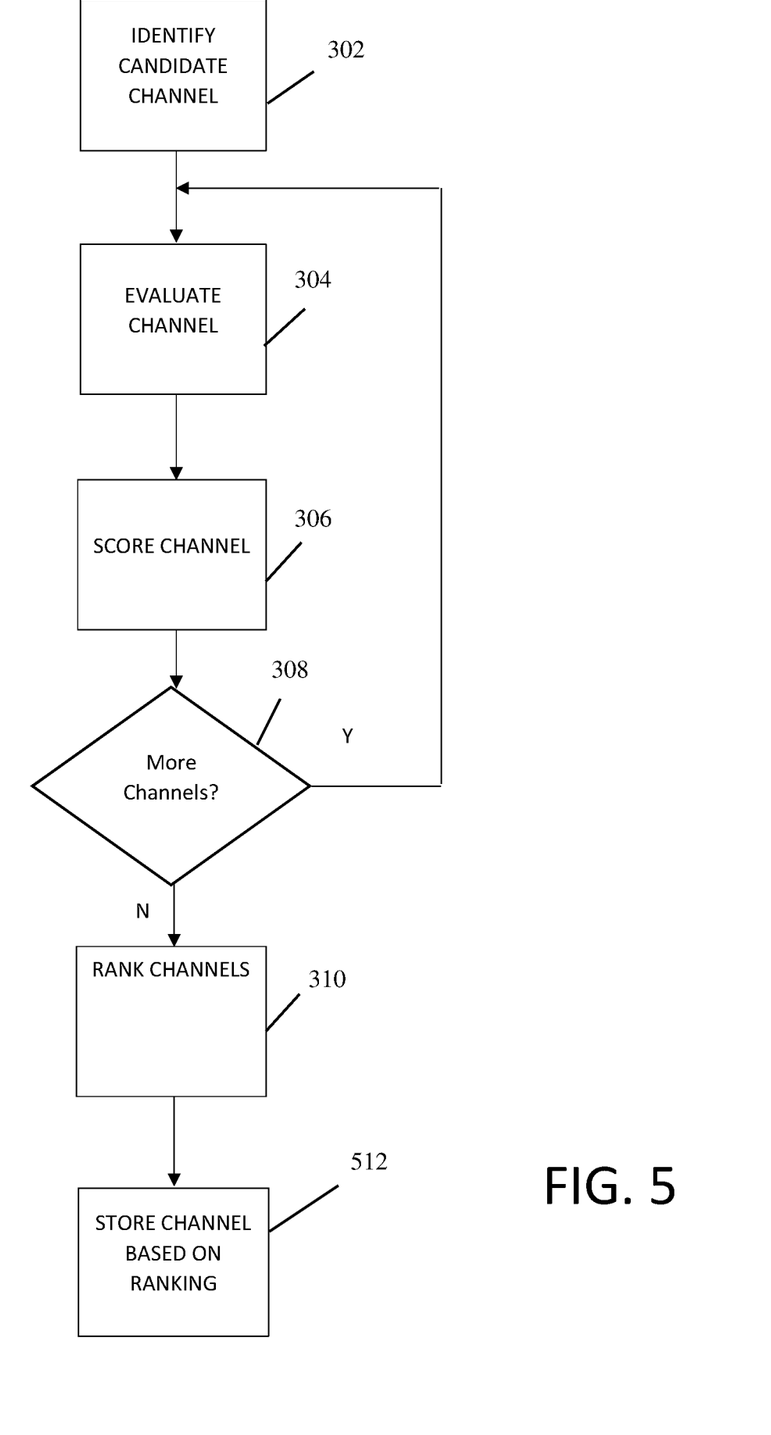
FIG. 5 is a flow chart of one embodiment of a process for evaluating channels for a network element in a shared spectrum communication system according to the teachings of the present invention.

FIG. 5 is a flow chart of one embodiment of a process for evaluating channels for a network element in a shared spectrum communication system according to the teachings of the present invention. The process of FIG. 5 is the process that is used by the channel evaluator in each of FIGS. 1, 4, and 6. The process of FIG. 5 differs from the process of FIG. 3 in that, at block 512, the process stores the results of the evaluation and scoring of the candidate channels. This data is then available for the CBSDs to request when a channel assignment is needed. Since this embodiment is not tied to a specific CBSD or a specific location, the channel results are stored in relation to a spatial dimension. In all other respects, the process of FIG. 5 is as described above with respect to FIG. 3.

Figure 6:
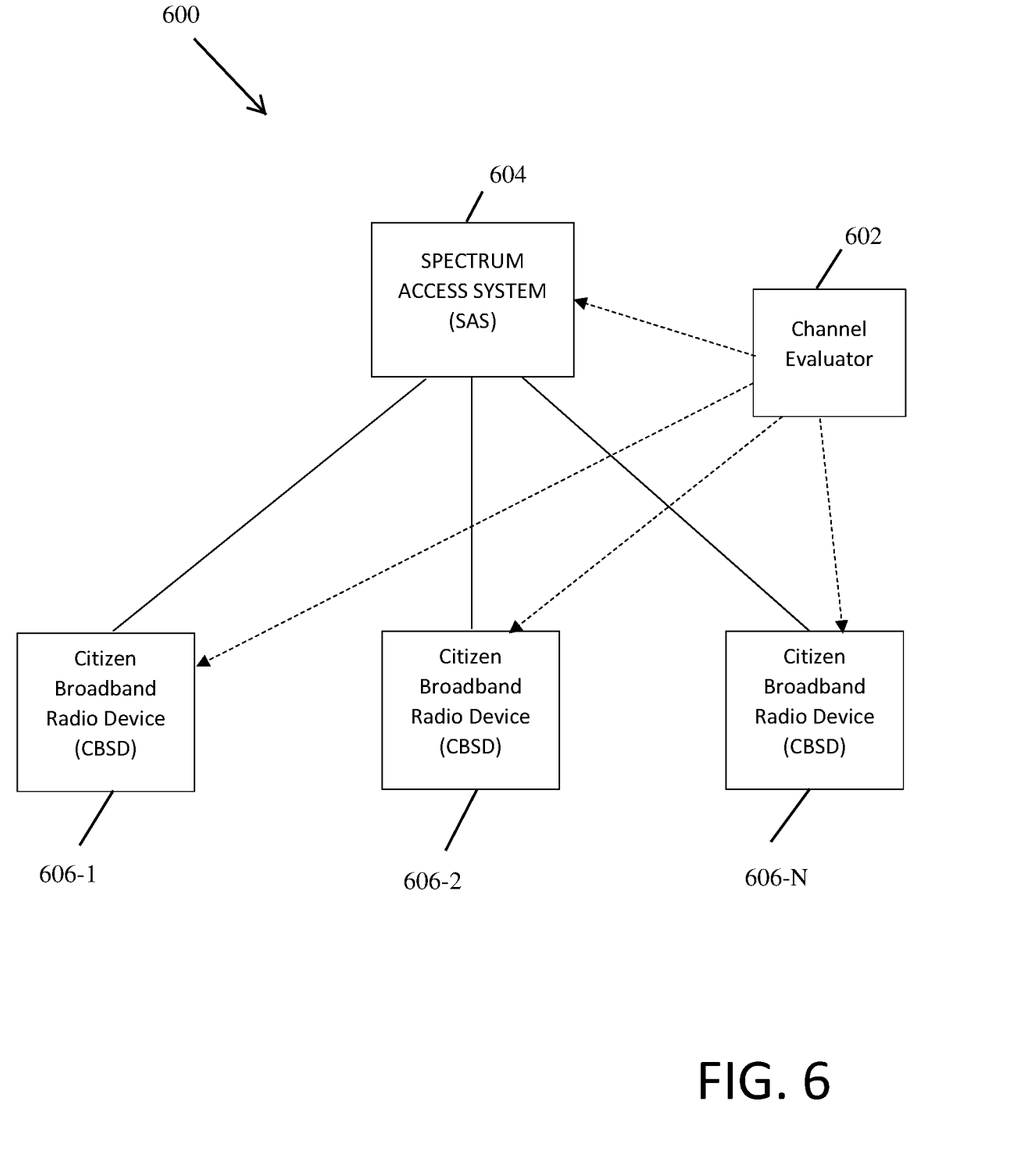
FIG. 6 is a block diagram of another embodiment of a shared spectrum communication system that includes a channel evaluator according to the teachings of the present invention.

FIG. 6 is a block diagram of another embodiment of a shared spectrum communication system, indicated at 600, which includes a channel evaluator 602 that is a stand-alone entity and is not disposed in SAS 604 or CBSDs 606-1 to 606-N. In this embodiment, channel evaluator 602 communicates directly with CBSDs 606-1 to 606-N or indirectly through SAS 604. Either way, channel evaluator pushes channel information to each CBSD based on criteria for the specific CBSD. In some embodiments, the channel evaluator 602 pushes channel rankings to the CBSDs 606-1 to 606-N. Each CBSD 606-1 to 606-N then uses the channel rankings to select and request one or more channels (such as primary and secondary/backup channels) from SAS 604 similarly as explained above. In other embodiments, channel evaluator 602 ranks and also selects the channel for the CBSD. In these embodiments, channel evaluator 602 just pushes the selected channel to the CBSD.

Figure 7:
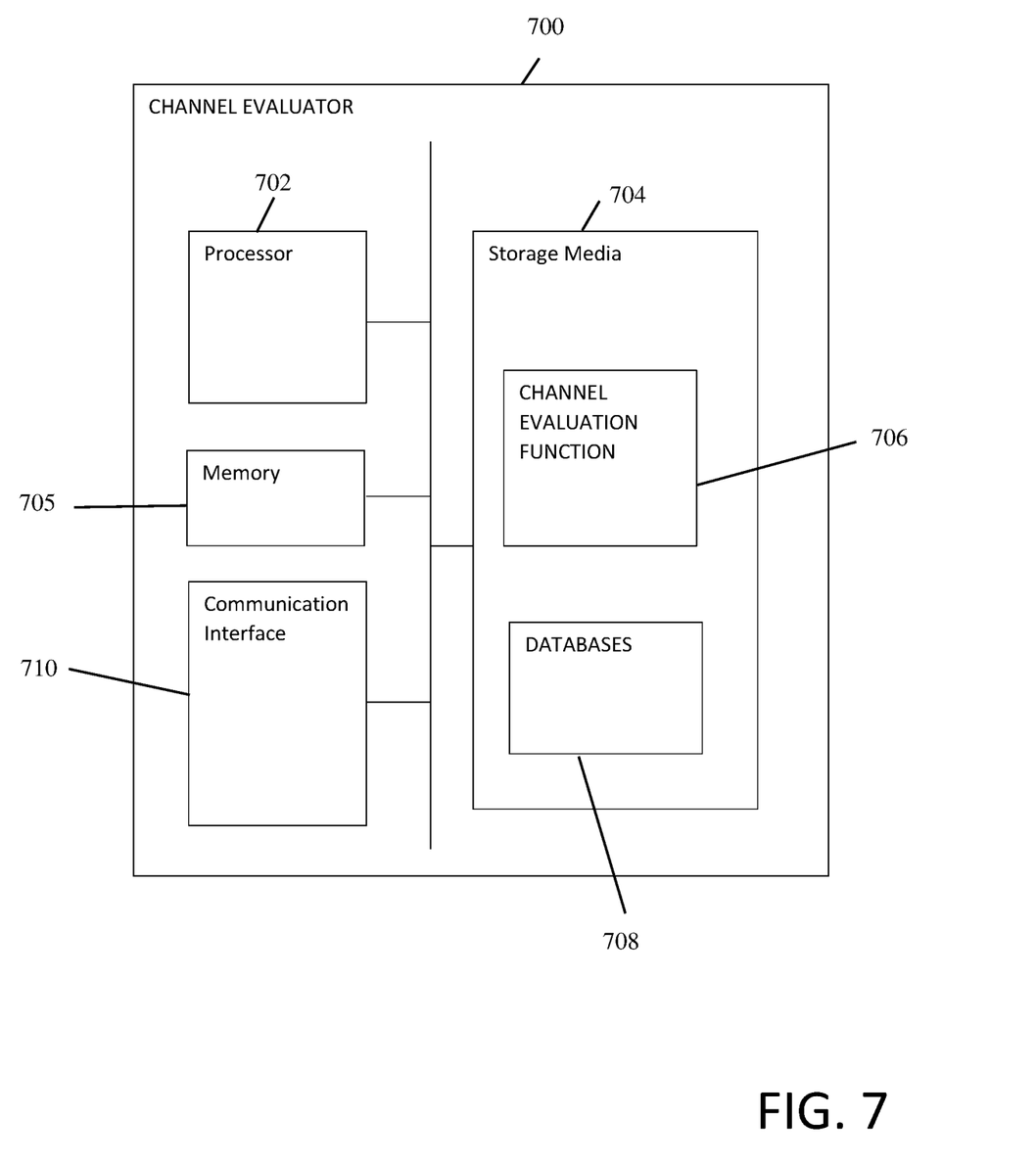
FIG. 7 is a block diagram of one embodiment of a channel evaluator that evaluates candidate channels for use by a network element in a shared spectrum communication system according to the teachings of the present invention.

FIG. 7 is a block diagram of one embodiment of a channel evaluator 700 that evaluates candidate channels for use by a network element in a shared spectrum communication system according to the teachings of the present invention. Channel evaluator 700 includes a processor 702 that is operable to read and execute instructions to perform the channel evaluation. In one embodiment, the instructions are stored (or otherwise embodied) on or in an appropriate non-transitory storage medium or media 704 (such as flash memory or other non-volatile memory, magnetic disc drives and/or optical disc drives) as channel evaluation function 706. Channel evaluator 700 includes memory 705 for storing the program instructions of channel evaluation function 706 (and any related data) during execution by the processor 702. Memory 705 comprises, in one implementation, any suitable form of random access memory (RAM) now known or later developed, such as dynamic random access memory (DRAM). In other embodiments, other types of memory are used. Functionality described here as being implemented in software (channel evaluation function 706) can be implemented in other ways (for example, using an application specific integrated circuit (ASIC) or field programmable gate array (FPGA)). When run by processor 702, channel evaluation function 706 evaluates candidate channels using, for example, the process described above with respect to FIG. 5. In that process, channel evaluation function 706 uses data, as needed for the various criteria. In some embodiments, that data may be stored in databases 708 stored on storage media 704 or may be retrieved from another entity such as SAS 104 of FIG. 1 over communication interface 710.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or Field Programmable Gate Arrays (FGPAs).

EXAMPLE EMBODIMENTS

Example 1 includes a method for selecting at least one channel for a network element in a shared spectrum communication system, the method comprising: identifying a plurality of candidate channels of a frequency band of the shared spectrum communication system; for each channel of the plurality of channels: evaluating the channel based on one or more of a plurality of criteria for the network element; scoring the channel based on the evaluation of the channel for the network element; and ranking the plurality of candidate channels based on the assigned scores for each of the plurality of channels; and selecting at least one channel based on the ranking of the plurality of candidate channels.

Example 2 includes the method of example 1, wherein evaluating the channel comprises evaluating the channel based on one or more of the plurality of criteria including: proximity to a dynamic protection area, existence of priority access license (PAL) that has not been activated or claimed as a PAL Protection Area (PPA), interference margin, historical use by an incumbent user, coverage area, location of the channel in the frequency band, and bandwidth of the channel.

Example 3 includes the method of any of examples 1 or 2, wherein scoring a channel comprises scoring the channel based on a weighted combination of the evaluations of the one or more of the plurality of criteria.

Example 4 includes the method of any of examples 1 through 3, wherein scoring a channel comprises combining the results of the evaluation of the one or more of the plurality of criteria.

Example 5 includes the method of any of examples 1 through 4, wherein scoring the channel comprises, for each of the one or more of the plurality of criteria, assigning a score that is one of a numeric score, a qualitative score or a binary score Example 6 includes the method of any of examples 1 through 5, wherein evaluating the channel comprises obtaining data from a source external to the network element.

Example 7 includes the method of example 6, wherein obtaining data comprises obtaining data from a spectrum access system (SAS).

Example 8 includes the method of any of examples 1 through 7, and further comprising requesting access to the selected at least one channel of the plurality of candidate channels.

Example 9 includes a method for ranking channels for a network element of a shared spectrum communication system, the method comprising: identifying a plurality of candidate channels of a frequency band of the shared spectrum communication system; for each channel of the plurality of channels: evaluating the channel based on one or more of a plurality of criteria for the network element; scoring the channel based on the evaluation of the channel for the network element; ranking the plurality of candidate channels for the network element based on the assigned scores for each of the plurality of candidate channels; and storing the ranking of the plurality of candidate channels for the network element to use in selecting a channel for wireless communication.

Example 10 includes the method of example 9, wherein evaluating the channel comprises evaluating the channel based on one or more of the plurality of criteria including: proximity to a dynamic protection area, existence of priority access license (PAL) that has not been activated or claimed as a PAL Protection Area (PPA), interference margin, historical use by an incumbent user, coverage area, location of the channel in the frequency band, and bandwidth of the channel.

Example 11 includes the method of any of examples 9 or 10, wherein scoring a channel comprises scoring the channel based on a weighted combination of the evaluations of the one or more of the plurality of criteria.

Example 12 includes the method of any of examples 9 through 11, wherein scoring a channel comprises combining the results of the evaluation of the one or more of the plurality of criteria.

Example 13 includes the method of any of examples 9 through 12, wherein scoring the channel comprises, for each of the one or more of the plurality of criteria, assigning a score that is one of a numeric score, a qualitative score or a binary score.

Example 14 includes the method of any of examples 9 through 13, wherein evaluating the channel comprises obtaining data from a source external to the network element.

Example 15 includes the method of example 14, wherein obtaining data comprises obtaining data from a spectrum access system (SAS).

Example 16 includes the method of any of examples 9 through 15, and further comprising sharing the channel rankings with the network element.

Example 17 includes a method for selecting a channel for a network element in a shared spectrum communication system, the method comprising: requesting a list of channels from a channel evaluator by the network element; receiving the list of channels, wherein the list of channels is ranked according to a score based on one or more criteria for the network element; selecting, by the network element, one or more of the channels from the list of channels; and requesting access to the selected one or more channels from a spectrum access system.

Example 18 includes the method of example 17, wherein requesting a list of channels from the channel evaluator comprises requesting a list of channels from the channel evaluator that is one of: part of the spectrum access system, part of the network element, or a separate entity.

Example 19 includes the method of any of examples 17 and 18, wherein requesting a list of channels further includes specifying the criteria to be used in scoring a set of candidate channels.

Example 20 includes the method of example 19, wherein specifying the criteria further comprises specifying relative weights to be given to each of the specified criteria.

Example 21 includes the method of any of examples 19 or 20, wherein specifying the criteria comprises specifying one or more of: proximity to a dynamic protection area, existence of priority access license (PAL) that has not been activated or claimed as a PAL Protection Area (PPA), interference margin, historical use by an incumbent user, coverage area, location of the channel in the frequency band, and bandwidth of the channel.

Example 22 includes a channel evaluator, comprising: a processor; a communication interface; a storage media, the storage media storing a channel evaluation function; and wherein the processor is configured to execute the channel evaluation function to evaluate channels for a network element of a shared spectrum communication system by: identifying a plurality of candidate channels of a frequency band of the shared spectrum communication system; for each channel of the plurality of channels: evaluating the channel based on one or more of a plurality of criteria for the network element; scoring the channel based on the evaluation of the channel for the network element; ranking the plurality of candidate channels for the network element based on the assigned scores for each of the plurality of candidate channels; and storing the ranking of the plurality of candidate channels for the network element to use in selecting a channel for wireless communication.

Example 23 includes the channel evaluator of example 22, wherein the channel evaluator is located in one of (1) the network element, (2) a spectrum access system, and (3) a stand-alone entity.

Example 24 includes the channel evaluator of any of examples 22 and 23, and further comprising a database that stores the plurality of criteria used by the channel evaluation function.

Example 25 includes the channel evaluator of any of examples 22-24, and further including a communication interface that is configured to enable communication with another entity to retrieve the plurality of criteria used by the channel evaluation function.

Example 26 includes the channel evaluator of any of examples 22-25, wherein evaluating the channel comprises evaluating the channel based on one or more of the plurality of criteria including: proximity to a dynamic protection area, existence of priority access license (PAL) that has not been activated or claimed as a PAL Protection Area (PPA), interference margin, historical use by an incumbent user, coverage area, location of the channel in the frequency band, and bandwidth of the channel.

Example 27 includes the channel evaluator of any of examples 22-26, wherein scoring a channel comprises scoring the channel based on a weighted combination of the evaluations of the one or more of the plurality of criteria.

Example 28 includes the channel evaluator of any of examples 22-27, wherein scoring a channel comprises combining the results of the evaluation of the one or more of the plurality of criteria.

Example 29 includes the channel evaluator of any of examples 22-28, wherein scoring the channel comprises, for each of the one or more of the plurality of criteria, assigning a score that is one of a numeric score, a qualitative score or a binary score.

Example 30 includes a non-transitory computer readable medium storing a program causing a computer to perform a method to evaluate a plurality of candidate channels for a network element in a shared spectrum communication system, the method comprising: identifying a plurality of candidate channels of a frequency band of the shared spectrum communication system; for each channel of the plurality of channels: evaluating the channel based on one or more of a plurality of criteria for the network element; scoring the channel based on the evaluation of the channel for the network element; ranking the plurality of candidate channels for the network element based on the assigned scores for each of the plurality of candidate channels; and storing the ranking of the plurality of candidate channels for the network element to use in selecting a channel for wireless communication.

Example 31 includes the non-transitory computer readable media of example 30, wherein evaluating the channel comprises evaluating the channel based on one or more of the plurality of criteria including: proximity to a dynamic protection area, existence of priority access license (PAL) that has not been activated or claimed as a PAL Protection Area (PPA), interference margin, historical use by an incumbent user, coverage area, location of the channel in the frequency band, and bandwidth of the channel.

Example 32 includes the non-transitory computer readable media of any of examples 30-31, wherein scoring a channel comprises scoring the channel based on a weighted combination of the evaluations of the one or more of the plurality of criteria.

Example 33 includes the non-transitory computer readable media of any of examples 30-32, wherein scoring a channel comprises combining the results of the evaluation of the one or more of the plurality of criteria.

Example 34 include the non-transitory computer readable media of any of examples 30-33, wherein scoring the channel comprises, for each of the one or more of the plurality of criteria, assigning a score that is one of a numeric score, a qualitative score or a binary score.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for selecting at least one channel for a network element in a shared spectrum communication system, wherein the shared spectrum communication system is defined by multiple levels of access based on an order of priority, wherein the shared spectrum communication system comprises a spectrum access system communicatively coupled to the network element, wherein the spectrum access system is configured to protect access to the shared spectrum for network elements associated with a highest priority level of access, the method comprising:
   identifying a plurality of candidate channels of a frequency band of the shared spectrum communication system;
   for each channel of the plurality of candidate channels:
      evaluating the channel based on an interference margin, wherein the interference margin is based on a difference between a total aggregate interference signal level and a threshold level for the network element;
      scoring the channel based on the evaluation of the channel for the network element; and
   ranking the plurality of candidate channels based on the scores for each of the plurality of channels; and
   selecting at least one channel based on the ranking of the plurality of candidate channels.

2. The method of claim 1, wherein scoring the channel based on the evaluation further comprises scoring the channel based on a difference between an individual interference signal level corresponding to the channel and a fair quota for the channel.

3. The method of claim 2, wherein the fair quota corresponds to a value of one divided by a total number of network elements that impact a protection point.

4. The method of claim 2, wherein scoring the channel based on the evaluation further comprises assigning a low score when the difference between the individual interference signal level corresponding to the channel and a fair quota is a negative number.

5. The method of claim 2, wherein scoring the channel based on the evaluation further comprises assigning a high score when the difference between the individual interference signal level corresponding to the channel and a fair quota is a positive number.

6. A method for selecting at least one channel for a network element in a shared spectrum communication system, wherein the shared spectrum communication system is defined by multiple levels of access based on an order of priority, wherein the shared spectrum communication system comprises a spectrum access system communicatively coupled to the network element, wherein the spectrum access system is configured to protect access to a shared spectrum to one or more incumbent users associated with a highest priority level of access, the method comprising:
   identifying a plurality of candidate channels of a frequency band of the shared spectrum communication system;
   for each channel of the plurality of candidate channels;
      evaluating the channel based on anticipated impact on communicative activity of the one or more incumbent users utilizing the frequency band;
      scoring the channel based on the evaluation of the channel for the network element; and
   ranking the plurality of candidate channels based on the scores for each of the plurality of channels; and
   selecting at least one channel based on the ranking of the plurality of candidate channels.

7. The method of claim 6, wherein evaluating the channel based on anticipated impact on communicative activity of one or more incumbent users utilizing the frequency band further comprises evaluating the channel based on a geographic distance between the channel and a channel used by the one or more incumbent users.

8. The method of claim 6, wherein evaluating the channel based on anticipated impact on communicative activity of one or more incumbent users utilizing the frequency band further comprises evaluating the channel based on a historical activation rate of at least one dynamic protection area by the one or more incumbent users.

9. The method of claim 6, wherein evaluating the channel based on anticipated impact on communicative activity of one or more incumbent users utilizing the frequency band further comprises evaluating the channel based on a coverage area requested by the network element.

10. The method of claim 6, wherein evaluating the channel based on anticipated impact on communicative activity of one or more incumbent users utilizing the frequency band further comprises evaluating the channel based on a requested bandwidth by the network element.

11. The method of claim 6, wherein evaluating the channel based on anticipated impact on communicative activity of one or more incumbent users utilizing the frequency band further comprises evaluating the channel based on a weighted combination of a plurality of criteria for the network element.

12. A channel evaluator, comprising:
   a processor;
   a communication interface; and
   a storage media, the storage media storing a channel evaluation function;
   wherein the processor is configured to execute the channel evaluation function to evaluate channels for a network element of a shared spectrum communication system, wherein the shared spectrum communication system is defined by multiple levels of access based on an order of priority, wherein the shared spectrum communication system comprises a spectrum access system communicatively coupled to the network element, wherein the spectrum access system is configured to protect access to a shared spectrum to one or more incumbent users associated with a highest priority level of access, wherein the processor is configured to execute the channel evaluation function to evaluate channels for the network element by:
   identifying a plurality of candidate channels of a frequency band of the shared spectrum communication system;
   for each channel of the plurality of candidate channels;
      evaluating the channel based on anticipated impact on communicative activity of the one or more incumbent users utilizing the frequency band;
      scoring the channel based on the evaluation of the channel for the network element; and
   ranking the plurality of candidate channels based on the scores for each of the plurality of channels; and
   selecting at least one channel based on the ranking of the plurality of candidate channels.

13. The channel evaluator of claim 12, wherein the processor is further configured to execute the channel evaluation function to evaluate channels by:

determining an aggregate interference signal for the channel; and comparing the aggregate interference signal with a threshold level, wherein the threshold level is determined based on an allowable interference with the one or more incumbent users for the channel.

14. The channel evaluator of claim 13, wherein scoring the channel based on the evaluation of the channel further comprises scoring the channel when the aggregate interference signal is below the threshold level.

15. The channel evaluator of claim 12, wherein evaluating the channel based on anticipated impact on communicative activity of one or more incumbent users utilizing the frequency band further comprises evaluating the channel based on a coverage area requested by the network element.

16. The channel evaluator of claim 12, wherein evaluating the channel based on anticipated impact on communicative activity of one or more incumbent users utilizing the frequency band further comprises evaluating the channel based on a requested bandwidth by the network element.

17. A method for ranking channels for a network element of a shared spectrum communication system, wherein the shared spectrum communication system is defined by multiple levels of access based on an order of priority, wherein the shared spectrum communication system comprises a spectrum access system communicatively coupled to the network element, wherein the spectrum access system is configured to protect access to a shared spectrum to one or more incumbent users associated with a highest priority level of access, the method comprising:

identifying a plurality of candidate channels of a frequency band of the shared spectrum communication system;

for each channel of the plurality of candidate channels;

evaluating the channel based on anticipated impact on communicative activity of the one or more incumbent users utilizing the frequency band;

scoring the channel based on the evaluation of the channel for the network element; and     ranking the plurality of candidate channels based on the scores for each of the plurality of channels; and     storing the ranking of the plurality of candidate channels for the network element to use in selecting a channel for wireless communication.

18. The method of claim 17, wherein evaluating the channel based on anticipated impact on communicative activity of one or more incumbent users utilizing the frequency band further comprises evaluating the channel based on a coverage area requested by the network element.

19. The method of claim 17, wherein evaluating the channel based on anticipated impact on communicative activity of one or more incumbent users utilizing the frequency band further comprises evaluating the channel based on a weighted combination of a plurality of criteria for the network element.

* * * * *